United States Patent [19]

Takeuchi et al.

[11] Patent Number: 5,710,859
[45] Date of Patent: Jan. 20, 1998

[54] IMAGE DATA RECORDER WHEREIN COMPRESSED DATA RECORDING IS STOPPED/STARTED AT A DIFFERENT TIME THAN COMMANDED

[75] Inventors: Yoshitaka Takeuchi, Tokyo; Akio Fujii, Yokohama, both of Japan

[73] Assignee: Canon Kabushiki Kaisha, Tokyo, Japan

[21] Appl. No.: 553,873

[22] Filed: Nov. 6, 1995

[30] Foreign Application Priority Data

Nov. 14, 1994 [JP] Japan .................... 6-278908

[51] Int. Cl.[6] ........................ H04N 5/917
[52] U.S. Cl. ........................ 386/111; 386/109
[58] Field of Search .................. 386/111, 112, 386/52, 4, 33, 37, 109, 123; 348/384; 360/32, 33.1; H04N 5/917

[56] References Cited

U.S. PATENT DOCUMENTS 5,140,437  8/1992  Yonemitsu et al. .................. 358/342
5,282,049  1/1994  Hatakenaka et al. ................. 358/335
5,479,264 12/1995  Ueda et al. ........................... 358/335

Primary Examiner—Robert Chevalier
Attorney, Agent, or Firm—Fitzpatrick, Cella, Harper & Scinto

[57] ABSTRACT

Apparatus and method for recording coded image data which is coded such that frames of image data are intermixed and grouped into predetermined encoding units includes structure and steps for receiving a stop recording command or a start recording command for stopping or starting a recording operation. Structure and steps are provided for stopping or starting recording the coded image data to a recording medium in response to the stop recording command or the start recording command, respectively. Structure and steps are provided for controlling the stopping or starting recording operation to stop or start recording the coded image data at the end of an encoding unit. Preferably, the image data is encoded according to the MPEG standard, and the recording of the image coded data is not stopped/started until an entire encoding block of a Group of Pictures (GOP) is received so that all information packets necessary to decode a complete frame are present before the recording is stopped/started.

20 Claims, 15 Drawing Sheets

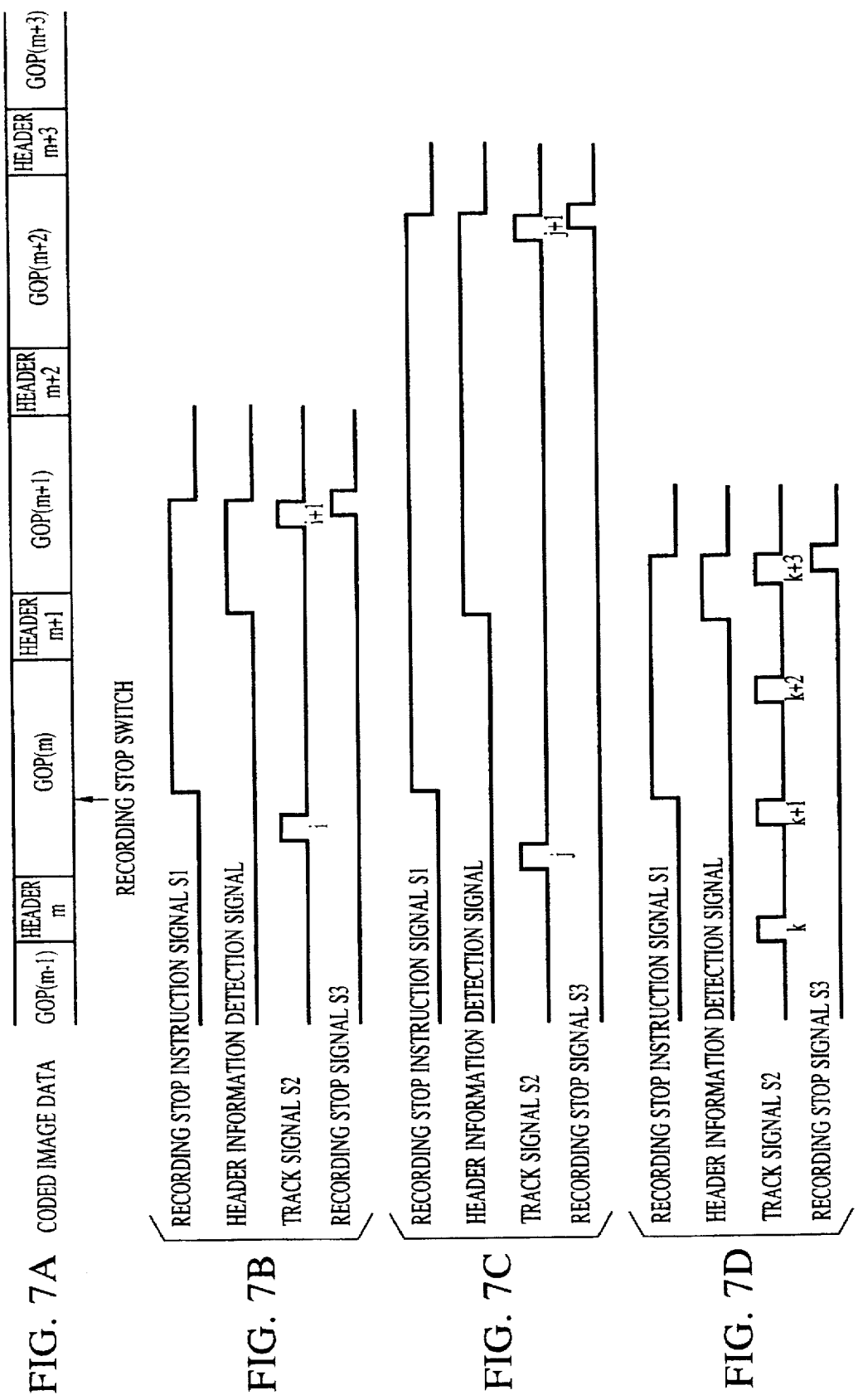

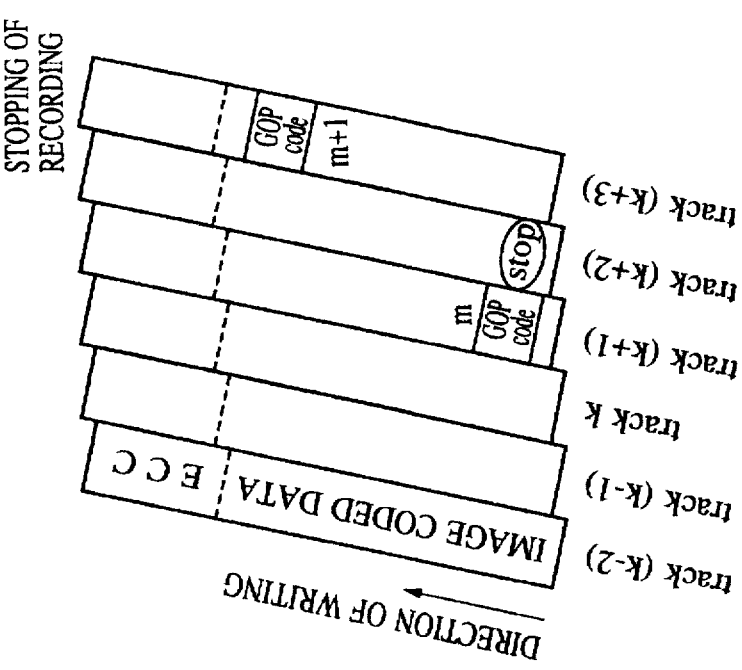
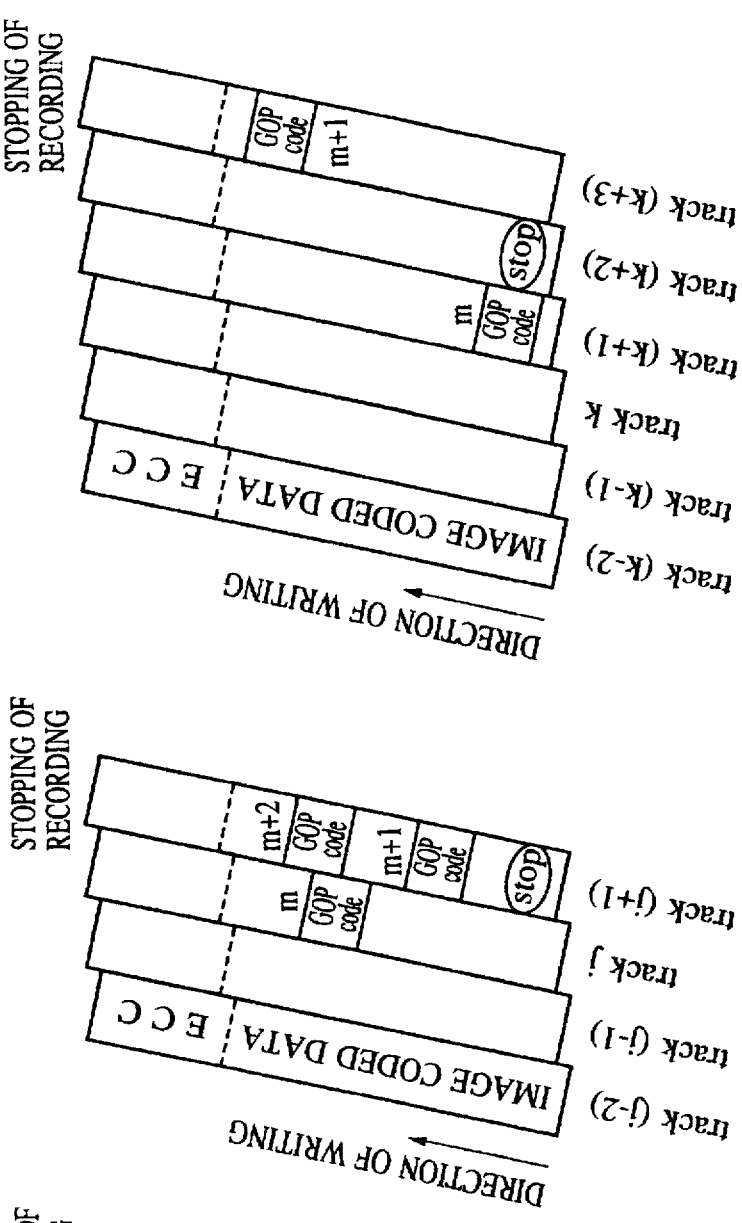
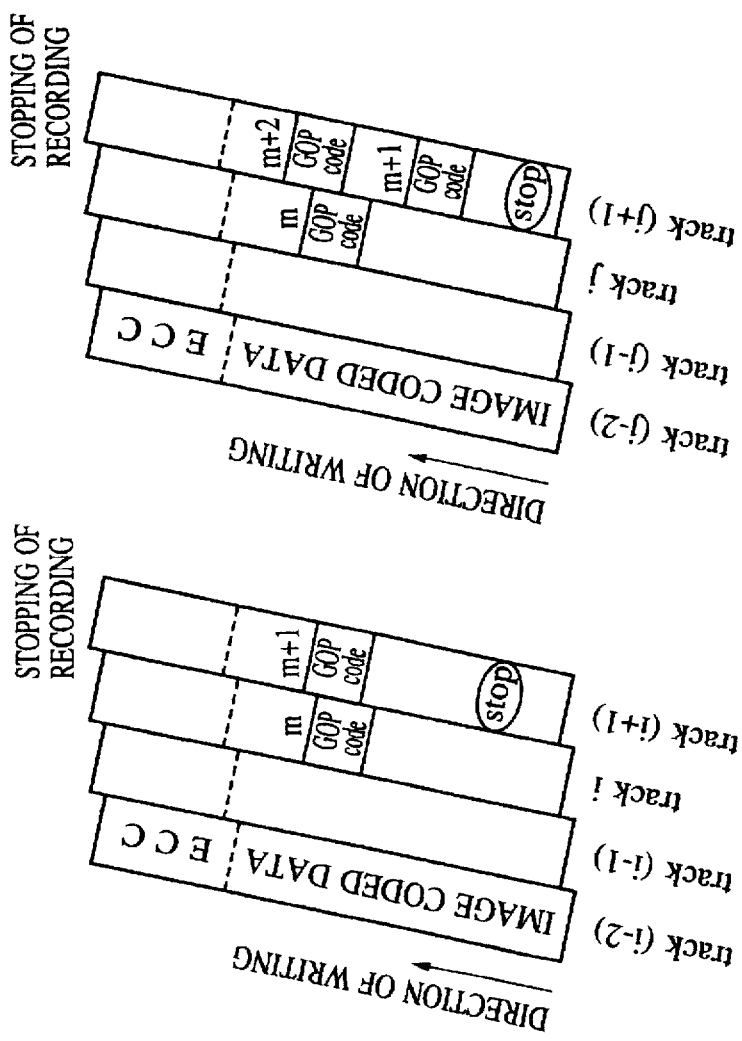

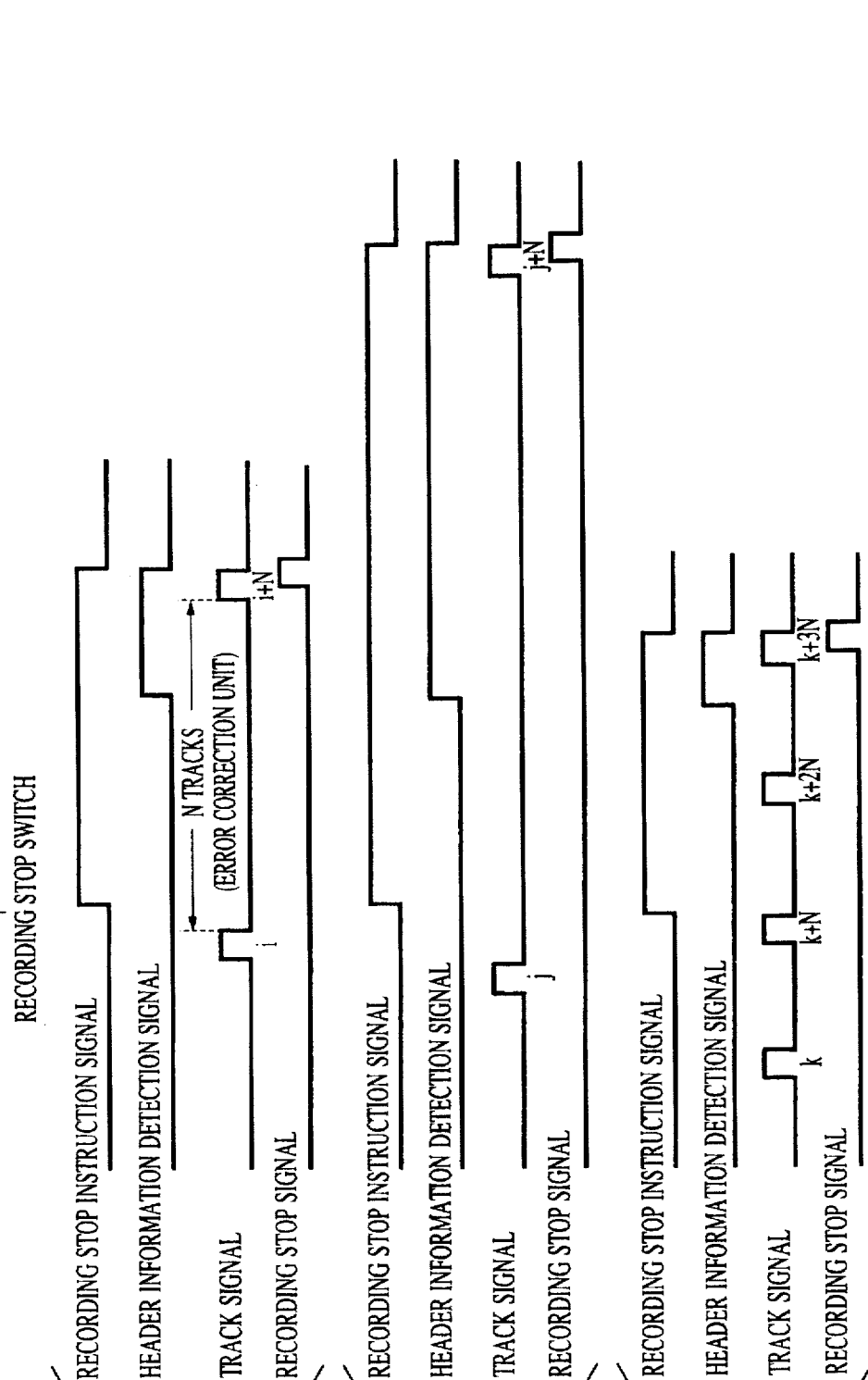

IMAGE DATA RECORDER WHEREIN COMPRESSED DATA RECORDING IS STOPPED/STARTED AT A DIFFERENT TIME THAN COMMANDED

BACKGROUND OF THE INVENTION

1. Field of the Invention

The present invention relates to an image data recorder. More particularly, the present invention is suitable for use in an image data recorder for recording compressed and coded moving picture digital signals in a predetermined recording medium.

2. Description of the Related Art

When moving picture digital signals are recorded, a method may be used in which, as shown in FIG. 1, image data 1001 is encoded 1002 and formed into packets by a packet formation device 1003, and transmitted to a transmission line 1005 via a transmitter 1004. Data transmitted through the transmission line 1005 is received by a receiver 1006, and the received data is recorded as it is in a recorder 1007.

One encoding method used for recording moving picture digital signals at the present time is a method employed by MPEG (Moving Picture Experts Group) that promotes the standardization of a moving picture encoding method. A description will be given below of an encoding method which conforms to the above-mentioned MPEG method.

Each frame of moving picture data is classified into three types, I picture, P picture, and B picture according to the processing method. That is, a frame in which intra-frame encoding is forced to be performed (intra frame) is called an I picture. A predictive frame which is selected from among the intra-frame encoding method and an inter-frame encoding method and which predicts from only previous frames is called a P picture. Further, a frame selected from among the intra-frame encoding method and the inter-frame encoding method and which predicts from previous and future frames, or predicts from a plurality of frames before and after the previous and future frames, is called a B picture.

These frames are arranged in such a way that the P picture and the I picture appear at every several continuous B pictures.

FIG. 2 shows an example in which a P picture appears at every two B pictures, and an I picture appears at the position of the P picture each time two P pictures appear.

These several frames which always include one I picture are grouped into GOPs (Group of Pictures) as encoding units at which recording and reproduction is possible. In FIG. 2, one I picture, two P pictures, and six B pictures are grouped into a GOP.

Various information for the image, such as a code indicating the start of GOP, is added as header information immediately before each coded GOP, and a bit stream shown in FIG. 3 is formed and transmitted to the transmission line. The image is decoded on the basis of the header information.

Of course, header information in which respective encoding methods and conditions (such as the type of I, P, and B pictures) is added to the beginning of each frame and each encoding unit block in the GOP.

As regards the encoding sequence of these frames, I and P pictures are encoded with priority given to these pictures so as to be prepared for the prediction of B pictures in between. When, for example, frames B3 and B4 are encoded in FIG. 2, frame I0, which is a prediction frame, is encoded at first, and then frames B3 and B4 are encoded. In a similar manner, in this GOP, the sequence in which frame P2 is encoded is changed with that of B5 and B6, and the sequence in which P3 frame is encoded is changed with that of B7 and B8.

As shown in the sequence of frames to be transmitted in FIG. 2, coded image data of each frame is transmitted to the transmission line in the sequence as it was originally coded and is recorded in this sequence. When the recorded image data is reproduced, the image data is returned to the original frame sequence when decoding is performed, and the image is reproduced.

FIG. 4 (comprising FIGS. 4A and 4B) is a block diagram illustrating an example of an encoder which conforms to MPEG.

As shown in FIG. 4, image data input from an image data input terminal 1201 is converted by a block formation circuit 1202 into data for every i×j block by raster scanning. This data formed into these blocks is switched for each processed block by a switch 1205 by intra-frame or inter-frame processing.

When the frame to be encoded is an I picture, this switching is forcedly selected to intra frame. In the case of the other P and B pictures, image data to be coded and the image data before and after the former image data, which are prediction candidates, are referred to from frame memories 1215 and 1218 and compared by an intra and inter mode determination circuit 1203, thereby determining an intra-frame or inter-frame encoding method.

Data in the case of intra frame is assumed to be as it is, and for data in the case of inter frame, a difference between the data and the data of the predictive frame is calculated by a subtracter 1204.

This data is passed through an orthogonal transform circuit 1207 and a quantization circuit 1208 and is variable-length-encoded by an encoding circuit 1209. Next, this image coded data is multiplexed with movement vector data (which is similarly coded) and data indicating each mode of I, P, and B pictures, and this data is transmitted to the transmission line.

As for a local decoding section for determining a predictive value of a predictive frame, the quantized data transmitted to the encoding circuit 1209 is decoded by an inverse quantization circuit 1211 and an inverse orthogonal transform circuit 1212, and is added to the data of the previous predictive frame by an adder 1214.

In this case also, control is effected in such a way that when data which is intra-encoded is decoded, the data is switched by a change-over switch 1206 to the intra frame side in correspondence with the switch 1205, and data of the previous predictive frame is not added.

The decoded data is transmitted to a backward predictive memory 1215, and thereafter data used for the forward prediction is stored in a forward predictive memory 1218.

Thereafter, these data are transmitted to movement detection circuits 1216 and 1219 in order to detect an optimum block for prediction where movement vector data is determined. Movement is compensated for by movement compensation circuits 1217 and 1220 by using the movement vector data in order to detect an optimum block for prediction.

In this way, the data which becomes predictive values is output as backward predictive data (BW) 1223, and forward predictive data (FW) 1224, respectively.

A selection is made from among the three types of data 1223, 1224, and interpolative data (IP) 1225 (which is determined from the backward predictive data 1223 and the forward predictive data 1224) according to the mode of P picture and B picture, and the data is switched by the switch 1227.

The encoder of FIG. 4 handles data as interpolative data in which an average value is calculated between FW and BW for each pixel in the block. Assuming the above-described reproduction image data is selected to be a predictive value, a difference value is calculated by the subtracter 1204.

As described above, as shown in FIG. 1, additional data, such as header information, is multiplexed with image data coded by using an encoding method in conformity with MPEG and formed into packets and then sent out to the transmission line 1005.

Data in the form of a bit stream which is transmitted from the transmission line 1005 and received by the receiver 1006 on the reception side is recorded by the recorder 1007 in the sequence in which it was received.

As described above, image data such that an encoding method in conformity with MPEG is used is coded in units of GOPs. Therefore, when such moving picture data is recorded, as shown in FIG. 5, if a recording stop switch is pressed at any point while a bit stream is being received, there is a case in which the right amount of image data in encoding units cannot be recorded.

That is, when the point is point A in the frame sequence on the transmission line in FIG. 2, namely, when the recording stop switch has been pressed before frame B5 is transmitted, though all of frame P2 (marked by O) two frames later can be recorded and reproduced, frames B5 and B6 (marked by x) which precede frame P2 cannot be reproduced.

SUMMARY OF THE INVENTION

In view of the above-described problems, an object of the present invention is to be able to record the correct amount of image data in encoding units.

According to one aspect of the present invention, there is provided an image data recorder in which image data, which is coded by a moving picture encoding method (including inter-frame encoding) in such a way that a plurality of frames in a moving picture are assumed to be one encoding unit, is recorded in predetermined recording units determined by a recording medium, wherein when the stopping of the image data is instructed, recording in the predetermined recording units is continued until all the currently recorded data in the encoding units are recorded in the recording medium.

According to another aspect of the present invention, the predetermined recording unit comprises an error-correcting-coding unit.

According to a further aspect of the present invention, the recording unit comprises N (N ≧ 1) tracks in a VTR using helical scan.

According to a still further aspect of the present invention, the moving picture encoding method is an encoding method in which inter frame encoding and inter frame prediction encoding are combined and used.

According to a still further aspect of the present invention, the moving picture encoding method is an encoding method in conformity with MPEG2, and the encoding unit is a GOP (group of pictures) in MPEG2.

According to a still further aspect of the present invention, there is provided an image data recorder in which image data, which is coded by a moving picture encoding method (including inter frame encoding) in such a way that a plurality of frames in a moving picture are assumed to be one encoding unit, is recorded in predetermined recording units determined by a recording medium, wherein when the starting of the image data is instructed, recording on the recording medium is started from the data in the encoding units after the currently input data in the encoding units.

Since the present invention comprises the above-described technical means, image data which is coded in such a way that a plurality of frames in a moving picture is assumed to be one encoding unit, is recorded in predetermined recording units determined by a recording medium. As a result, when stopping of recording is instructed, recording in recording units is continued until all the currently recorded data in the encoding units are recorded on the recording medium, and thus the right amount of image data in the encoding units can be recorded on the recording medium.

According to the present invention, when starting of recording is instructed, recording is started from data in encoding units after the currently input data in the encoding units. Thus, it is possible to prevent a problem that only a part of image data in encoding units is recorded on a recording medium.

According to a first facet of the present invention, an image data recorder includes input means for inputting coded data in which intra-frame coded data and inter-frame coded data are mixed in at predetermined intervals. Recording means are provided for recording the coded data on a recording medium in a plurality of tracks. Instruction means are provided for giving an instruction that recording by the recording means is to be stopped. Control means are provided for detecting an end of each track, and for stopping recording on the basis of a combination of (i) the operation of the instruction means, (ii) the predetermined intervals, and (iii) the detection of the end of each track.

According to another facet of the present invention, an image data recorder for recording image data coded by a moving picture encoding method that includes inter-frame encoding wherein a plurality of frames in a moving picture are assumed to be one encoding unit and wherein the image data is recorded in predetermined recording units determined by a recording medium comprises means for detecting an instruction to start recording of the image data. Means are provided for recording on the recording medium the image data of an encoding unit which is after the encoding unit of the currently input data.

According to a further facet of the present invention, a method of recording coded image data which is coded such that frames of image data are intermixed and grouped into predetermined encoding units comprises the steps of (i) receiving a stop recording command or a start recording command for stopping or starting a recording operation; (ii) stopping or starting recording decoded image data to a recording medium in response to the stop recording command or the start recording command, respectively; and (iii) controlling the stopping or starting recording operation to stop or start recording the coded image data at the end of an encoding unit.

According to still a further facet of the present invention, apparatus for recording coded image data which is coded such that frames of image data are intermixed and grouped into predetermined encoding units comprises means for receiving a start recording command or a stop recording command for stopping or starting a recording operation.

Means are provided for stopping or starting recording the coded image data to a recording medium in response to the stop recording command or the start recording command, respectively. Control means are provided for controlling the stopping or starting recording operation to stop or start recording the coded image data at the end of an encoding unit.

The above and further objects, aspects, and novel features of the invention will more fully appear from the following detailed description when read in connection with the accompanying drawings.

BRIEF DESCRIPTION OF THE DRAWINGS

FIGS. 7A, 7B, 7C, and 7D show timings at which stopping of recording is controlled when a recording unit is one track in accordance with the first embodiment of the present invention;

FIGS. 8A, 8B and 8C show timings at which stopping of recording is controlled when a recording unit is one track in the form of an image on a track pattern in accordance with the first embodiment of the present invention;

FIGS. 9A, 9B, 9C, and 9D show timings at which stopping of recording is controlled when a recording unit is N tracks in accordance with the first embodiment of the present invention;

DETAILED DESCRIPTION OF THE PREFERRED EMBODIMENTS

A first embodiment of an image data recorder of the present invention will be described below with reference to FIGS. 6 to 14.

Figure 1:
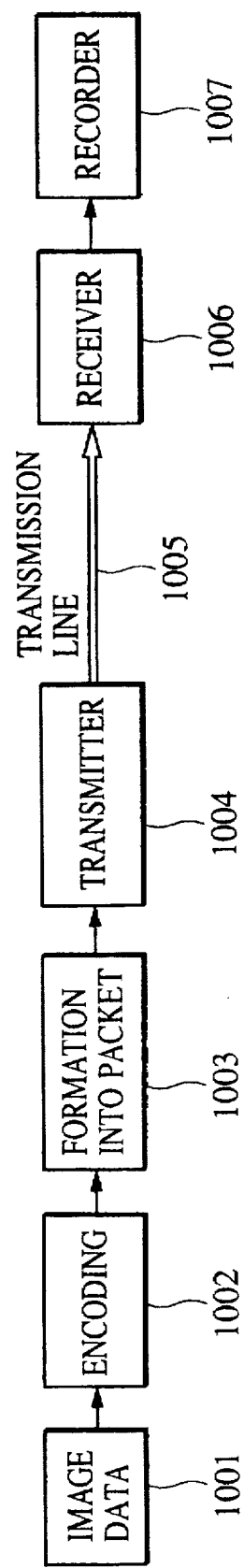
FIG. 1 is a block diagram illustrating a transmission system in which image data is recorded.
Figure 2:
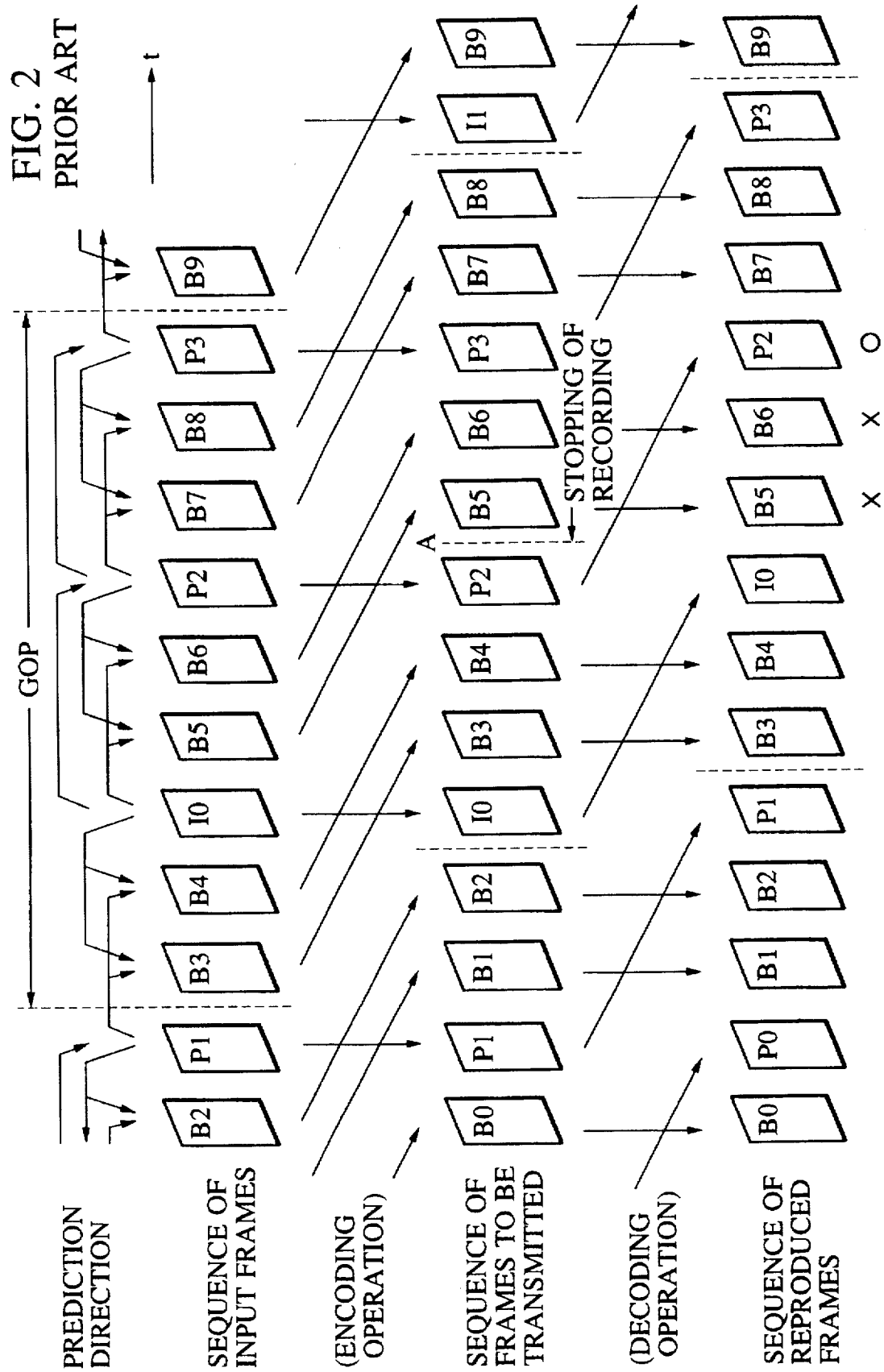
FIG. 2 shows the sequence in which image frames are transmitted.
Figure 3:
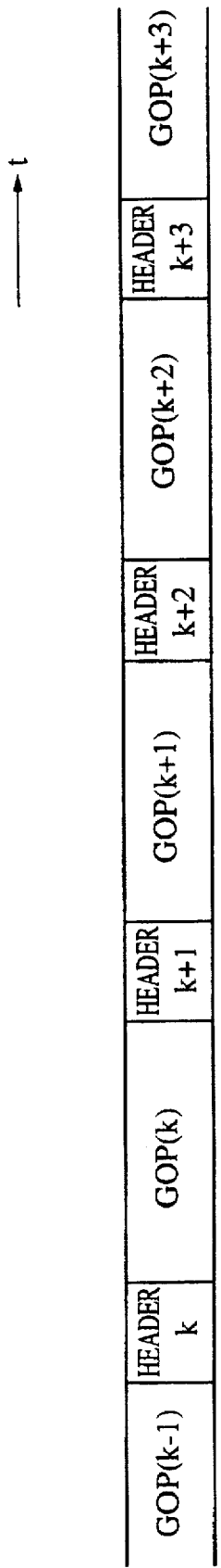
FIG. 3 shows the sequence in which a GOP bit stream of image data and GOP header information added thereto is transmitted.
Figures 4, 4A:
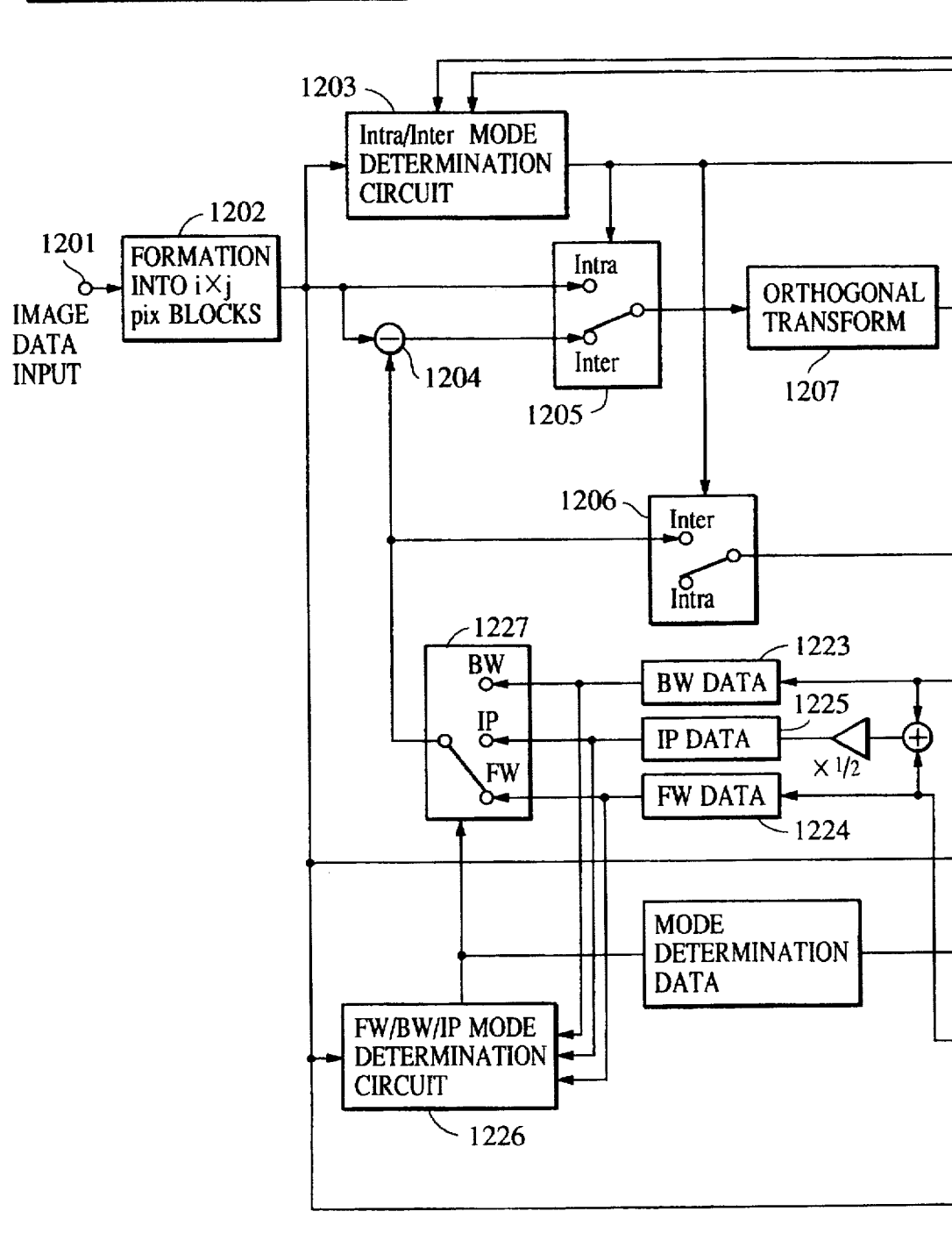
FIG. 4 (comprising FIGS. 4A and 4B) is a block diagram illustrating a moving picture encoding method which conforms to MPEG.
Figure 4B:
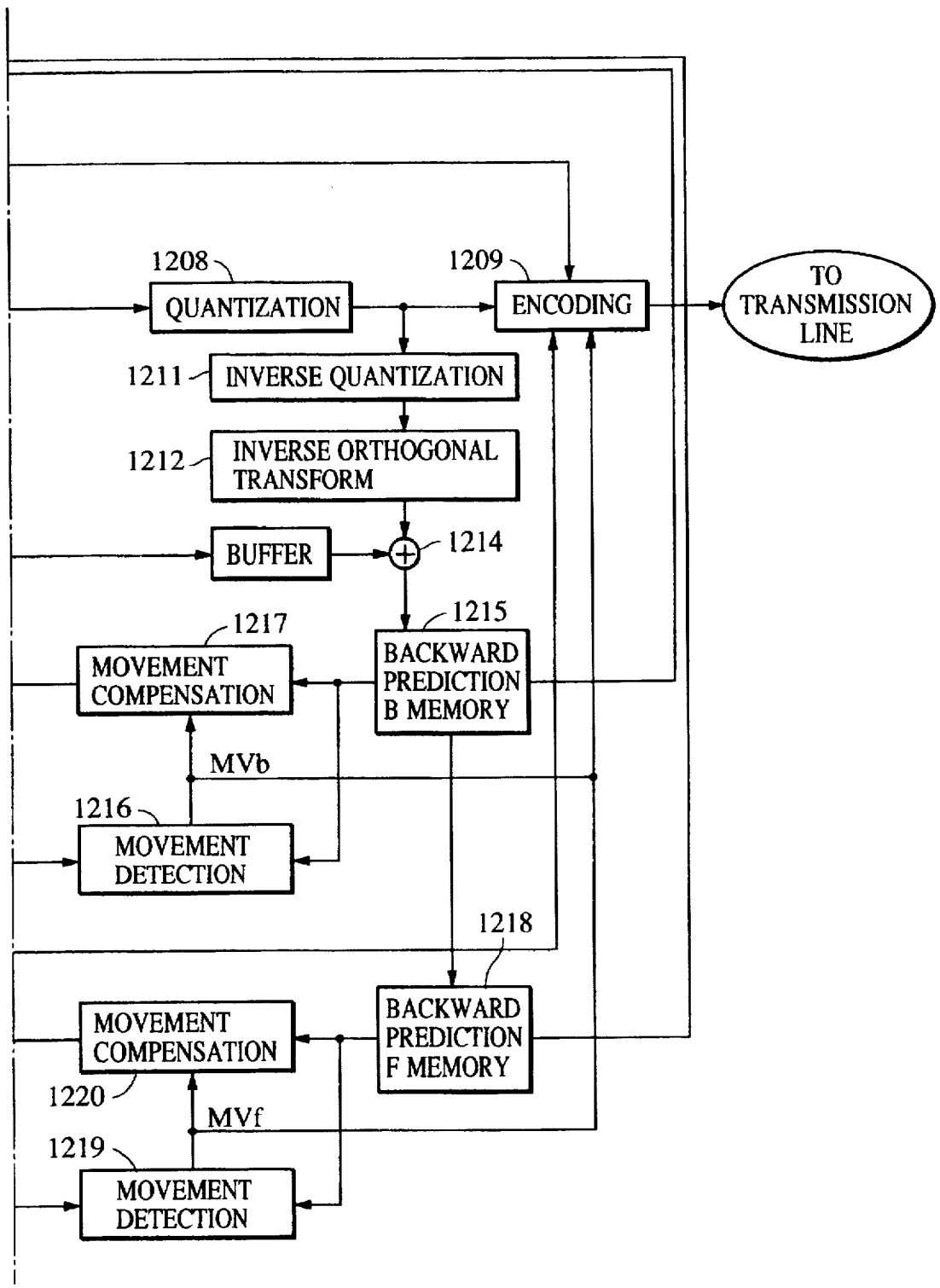
Figure 5:
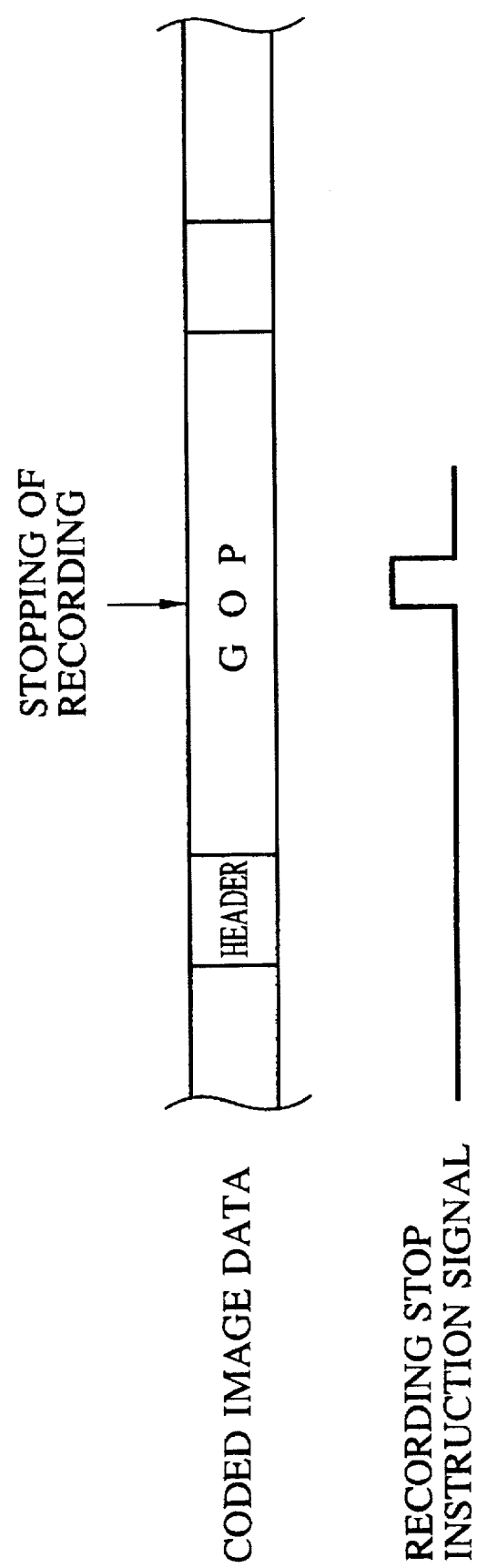
FIG. 5 shows a timing at which a stop instruction signal is input in order to stop recording while a bit stream of received image data is being recorded.
Figure 6:
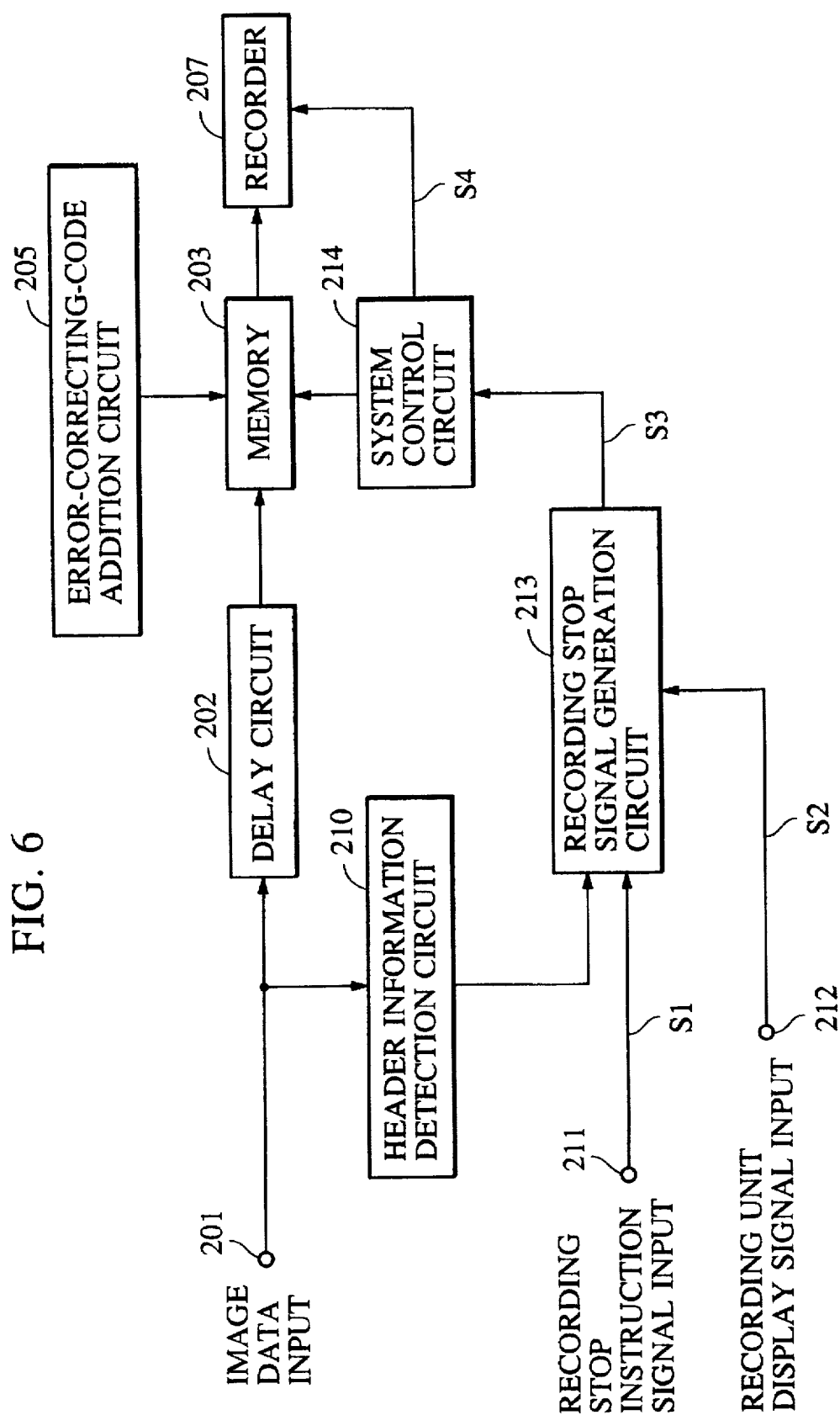
FIG. 6 is a block diagram illustrating a circuit for controlling stopping of recording in accordance with a first embodiment of the present invention.

As shown in FIG. 6, image coded data input from an image data input terminal 201 is sent out to a delay circuit 202 and a header information detection circuit 210. The delay circuit 202 delays transmission of data by an amount of the period in which header information is detected. Thereafter, an error-correcting-code is added to the data sent out to a memory 203 by an error-correcting-code addition circuit 205. The data is read out in response to a control signal from a system control circuit 214, and sent out to a recorder 207 whereby the data is recorded.

All of signals output from the header information detection circuit 210, a recording stop instruction signal S1 generated when a recording stop switch (not shown) is pressed, which is input from a recording stop instruction signal input terminal 211, and a recording unit display signal S2, which is input from a recording unit display signal input terminal 212, are sent out to a recording stop signal generation circuit 213. A recording stop signal S3 output from the recording stop signal generation circuit 213 is sent out to a system control circuit 214. In response to input signal S3, the system control circuit 214 performs an operation for reading out image data from the memory 203, and an operation for generating a recording operation stop signal S4 for stopping the operation of the recorder 207.

Next, a description will be given of a process in which the recording operation stop signal S4 is generated and sent out to the system control circuit 214 whereby the recording operation is stopped.

Initially, a description will be given of an example in which an error correction unit is completed for one track of a magnetic recording medium using helical scan, and data is recorded by making this unit a recording unit.

FIGS. 7B, 7C, and 7D show timings at which recording is stopped for a bit stream of coded image data received.

FIGS. 8A, 8B and 8C show a method of performing control at timings of FIGS. 7B, 7C, and 7D in the form of an image on a track pattern.

The recording stop instruction signal is a signal which is generated when a recording stop switch (not shown) is pressed and is input from the recording stop instruction signal input terminal 211 in FIG. 6. In the timing charts of all of FIGS. 7B, 7C, and 7D, it is assumed that the switch is pressed while data of GOP (m) is being received.

In FIGS. 7B, 7C, and 7D, the header information detection signal is a signal which is generated when a code indicating the beginning of the GOP is detected from the bit stream of the image data and which is output from the header information detection circuit 210 in FIG. 6.

A track signal is a signal indicating the timing of the end of each recording track and is a signal input from the recording unit display signal input terminal 212 in FIG. 6.

When these three types of signals are synchronized in the recording stop signal generation circuit 213, this circuit 213 generates the recording stop signal S3. The recording stop signal S3 is sent out to the system control circuit 214. In response to the signal, the system control circuit 214 effects control such that the recording operation stop signal S4 for stopping the image data recording operation is generated to stop the recording operation of the recorder.

FIG. 7B shows that the recording stop instruction signal S1 is input while image data of GOP (m) is being received. A code indicating the beginning of GOP (m+1) is detected from among header information of GOP (m+1) which is header information just after GOP (m). When a signal indicating the termination of track (i+11) on which the data is recorded is received, the recording stop signal S3 is generated.

With this operation, it is possible to record without any omissions up to track (i+1) including the image data at the end of GOP (m) in which the switch for stopping recording is pressed.

FIG. 7C shows that the recording stop instruction signal S1 is input while image data of GOP (m) is being received. A code indicating the beginning of GOP (m+1) is detected from among header information of GOP (m+1) which is header information just after GOP (m). When a signal indicating the end of track (j+1) on which the data is recorded is received, the recording stop signal S3 is generated.

With this operation, it is possible to record without any omissions up to track (j+1) including the image data at the end of GOP (m) in which the switch for stopping recording is pressed.

FIG. 7D shows that the recording stop instruction signal S1 is input while image data of GOP (m) is being received. A code indicating the beginning of GOP (m+1) is detected from among header information of GOP (m+1) which is header information just after GOP (m). When a signal indicating the end of track (k+3) on which the data is recorded is received, the recording stop signal S3 is generated.

With this operation, it is possible to record without any omissions up to track (k+3) including the image data at the end of GOP (m) in which the switch for stopping recording is pressed.

Figure 10:
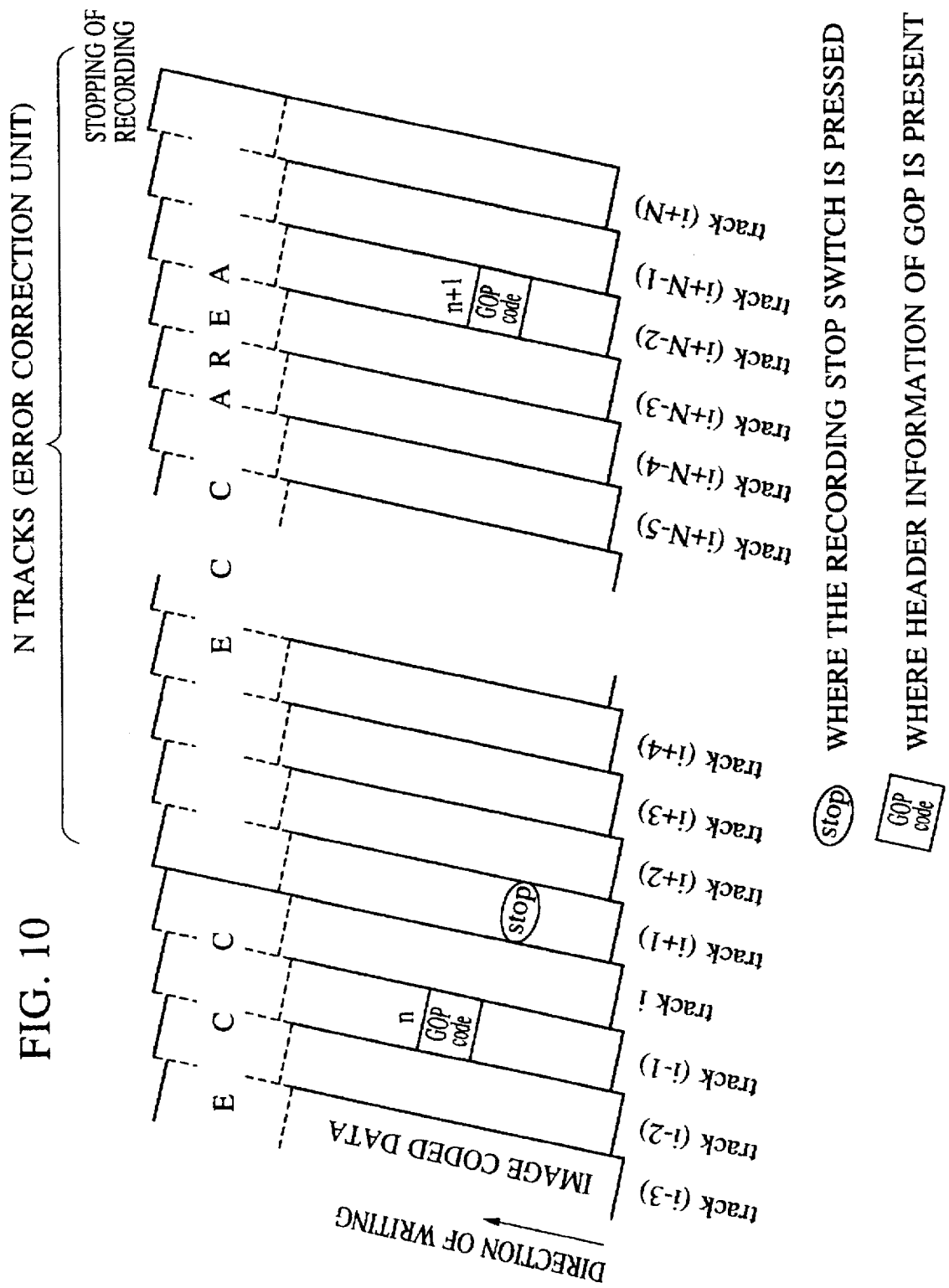
FIG. 10 shows timings at which stopping of recording is controlled when a recording unit is N tracks in the form of an image on a track pattern in accordance with the first embodiment of the present invention.

Next, as shown in FIG. 10, a description will be given of an example in which an error correction unit is completed for every N tracks of a magnetic recording medium using helical scan, and data is recorded by making this unit to be a recording unit.

FIGS. 9B, 9C, and 9D each show timings at which recording of a bit stream of coded image data received is stopped.

Figure 11:
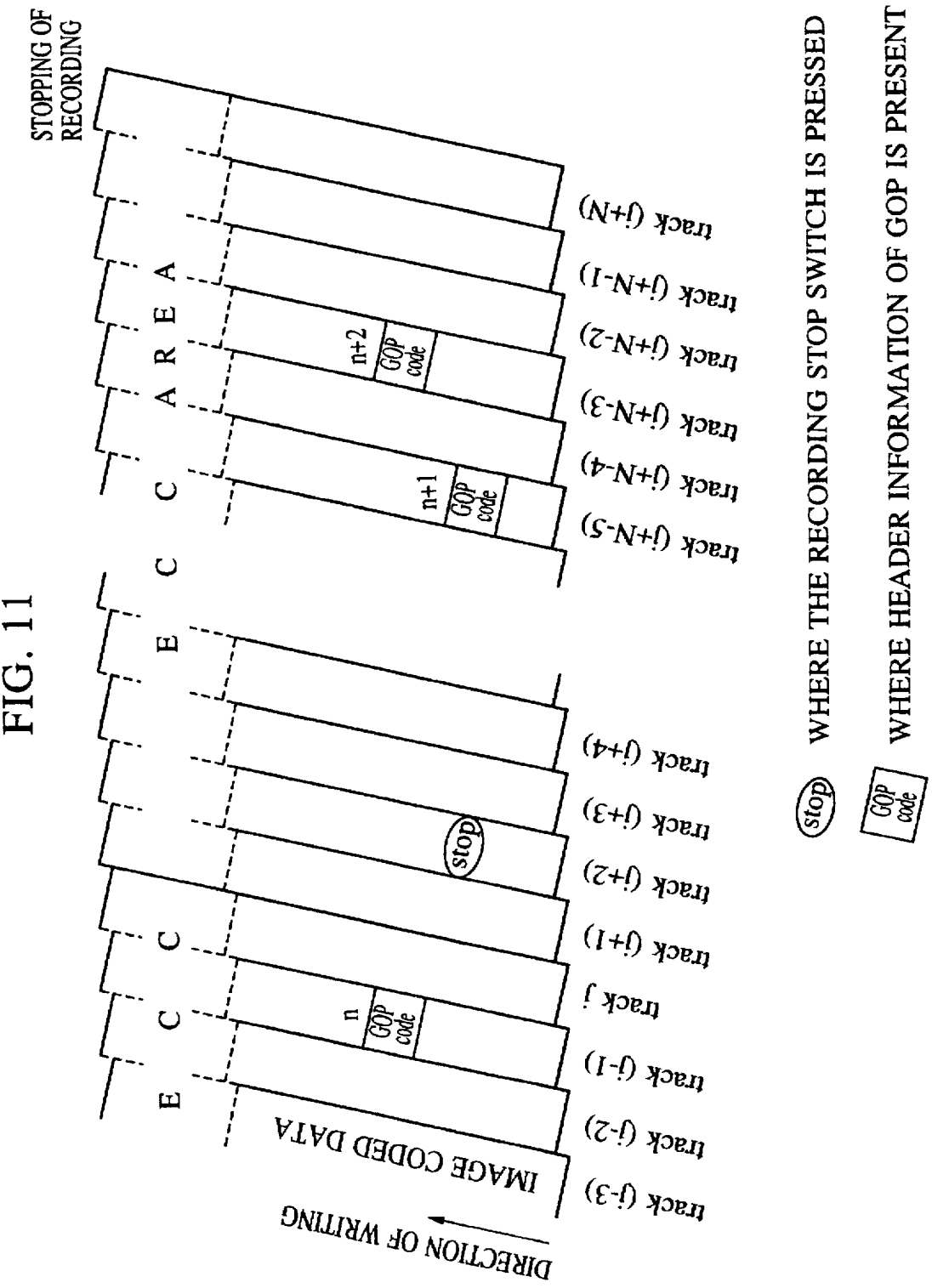
FIG. 11 shows timings at which stopping of recording is controlled when a recording unit is N tracks in the form of an image on a track pattern in accordance with the first embodiment of the present invention.
Figure 12:
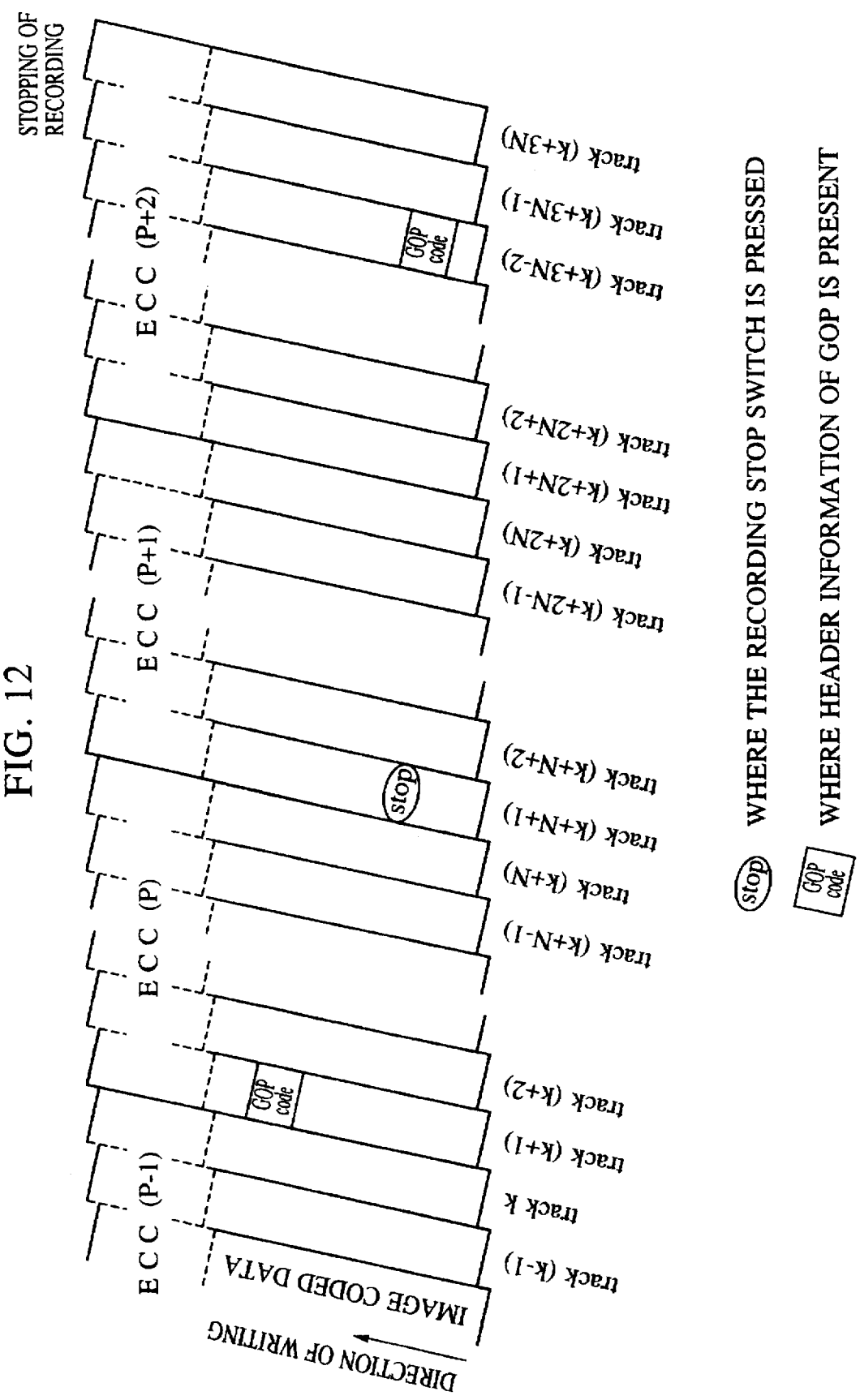
FIG. 12 shows timings at which stopping of recording is controlled when a recording unit is N tracks in the form of an image on a track pattern in accordance with the first embodiment of the present invention.

FIGS. 10 to 12 show a method of performing control at the timings of FIGS. 9B, 9C, and 9D in the form of an image on a track pattern.

The recording stop instruction signal S1 is a signal generated when the recording stop switch (not shown) is pressed, and is a signal input from the recording stop instruction signal input terminal 211 in FIG. 6. In the timing charts of FIGS. 9B, 9C, and 9D, it is assumed that the switch is pressed while data of GOP (n) is being received in all of FIGS. 10 to 12.

The header information detection signal is a signal which is generated when a code indicating the beginning of GOP is detected from among the bit stream of the image data and is output from the header information detection circuit 210 in FIG. 6.

The track signal is a signal indicating the timing of the end for every N tracks which are recording tracks and is a signal output from the recording unit display signal input terminal 212 in FIG. 6. When these three types of signals are synchronized in the recording stop signal generation circuit 213, this circuit 213 generates the recording stop signal S3. The recording stop signal S3 is sent out to the system control circuit 214. In response to the signal, the system control circuit 214 effects control to stop the image data recording operation.

FIG. 9B shows that the recording stop instruction signal S1 is input while image data of GOP (n) is being received. A code indicating the beginning of GOP (n+1) is detected from among header information of GOP (n+1) which is header information just after GOP (n). When a signal indicating the termination of the end track (i+N) within the recording unit on which the data is recorded is received, the recording stop signal S3 is generated.

With this operation, it is possible to record without any omissions up to track (i+N) including the image data at the end of GOP (n) in which the switch for stopping recording is pressed.

FIG. 9C shows that the recording stop instruction signal S1 is input while image data of GOP (n) is being received. A code indicating the beginning of GOP (n+1) is detected from among header information of GOP (n+1) which is header information just after GOP (n). When a signal indicating the end of the end track (j+N) within the recording unit on which the data is recorded is received, the recording stop signal S3 is generated.

With this operation, it is possible to record without any omissions up to track (i+N) including the image data at the end of GOP (n) in which the switch for stopping recording is pressed.

FIG. 9C shows that the recording stop instruction signal S1 is input while image data of GOP (n) is being received. A code indicating the beginning of GOP (n+1) is detected from among header information of GOP (n+1) which is header information just after GOP (n). When a signal indicating the termination of the end track (k+3N) within the recording unit on which the data is recorded is received, the recording stop signal S3 is generated.

With this operation, it is possible to record without any omissions up to track (k+3N) including the image data at the end of GOP (n) in which the switch for stopping recording is pressed.

Next, an operation at recording start time in accordance with a second embodiment of the present invention will be described with reference to FIGS. 13 and 14.

Figure 13:
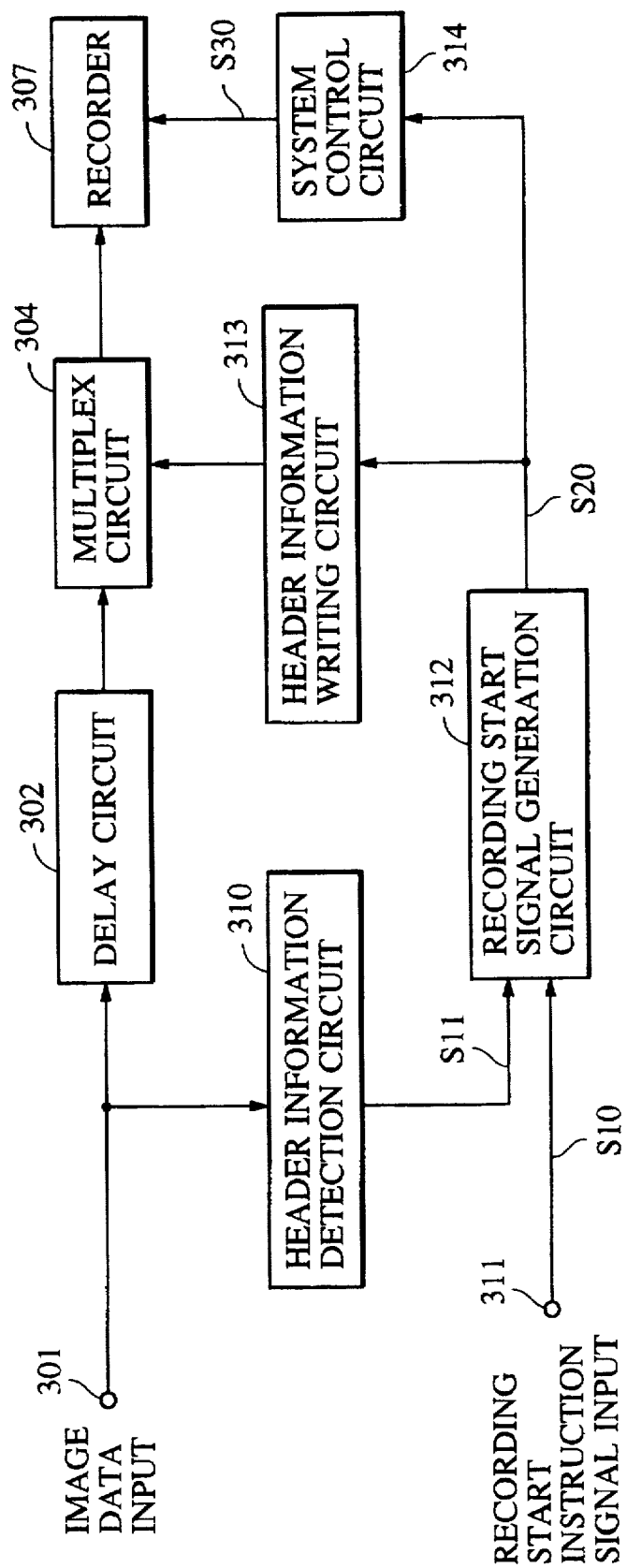
FIG. 13 is a block diagram illustrating a circuit for controlling starting of recording in accordance with a second embodiment of the present invention.

FIG. 13 is a block diagram illustrating circuits for synchronizing the timings of starting of the recording operation, which circuits are provided immediately before the recorder.

Image coded data input from an image data input terminal 301 is sent out to a delay circuit 302 and a header information detection circuit 310. The delay circuit 302 detects the header information and delays the transmission of data by an amount of the period in which the recording operation is started. Thereafter, the data is sent out to a multiplex circuit 304 for writing a code indicating the starting of recording in the header information of GOP, this image coded data is sent out to a recorder 307, and recording is started in accordance with a control signal from a system control circuit 314.

A signal output from the header information detection circuit 310, and a recording start instruction signal S10 (which is generated when a recording start switch (not shown) is pressed, and which is input from a recording start instruction signal input terminal 311) are sent to a recording start signal generation circuit 312.

A recording start signal S20 generated from the recording start signal generation circuit 312 is sent out to the system control circuit 314 and a header information writing circuit 313. In response to the signal, the header information writing circuit 313 generates a signal for multiplexing recording start information with coded image data, and the system control circuit 314 generates a signal S30 for starting the operation of the recorder 307.

Next, a description will be given of a process in which a recording start signal S30 is generated and a recording operation is started by the system control circuit 314.

Figure 14:
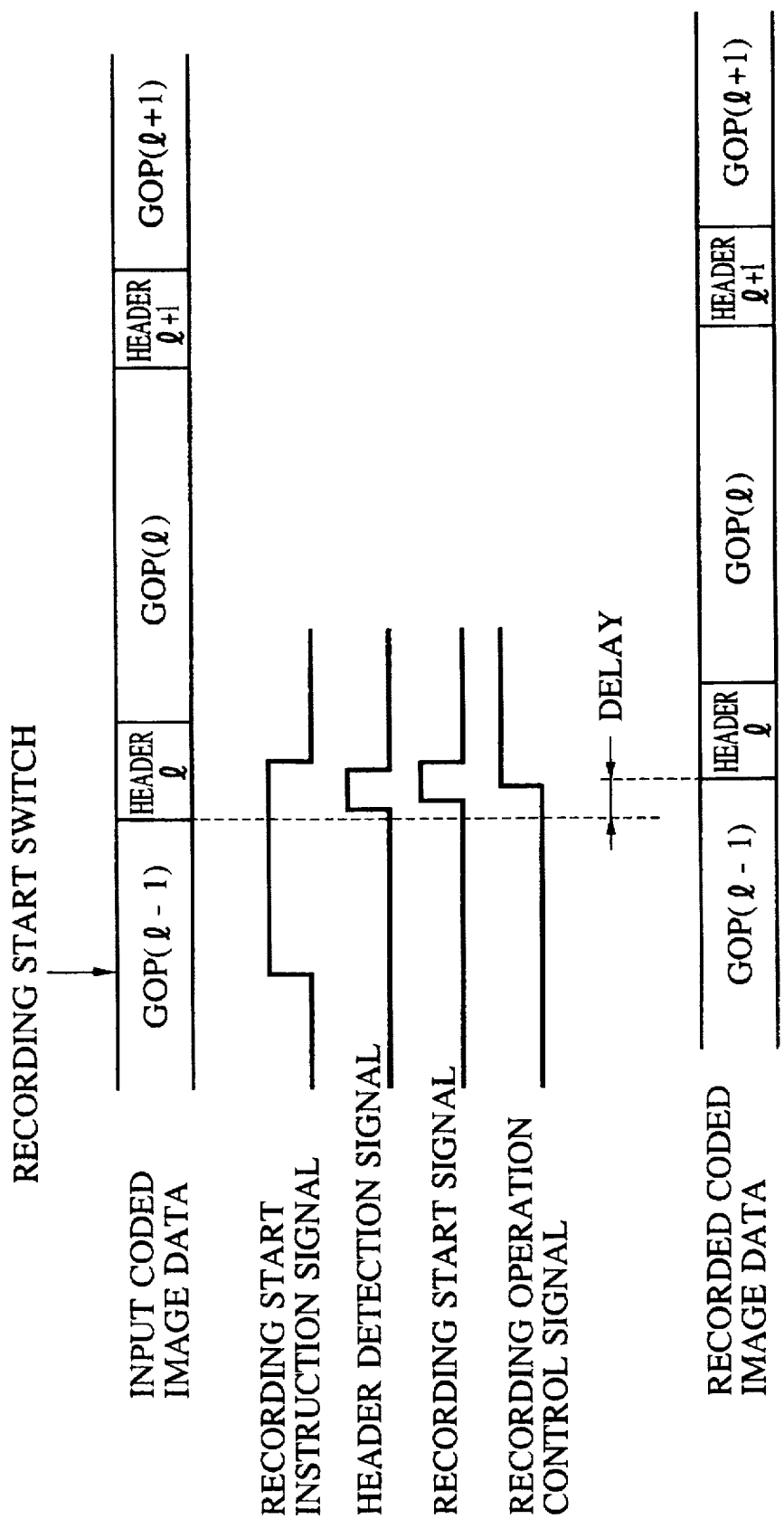
FIG. 14 shows timings at which starting of recording is controlled in accordance with the second embodiment of the present invention.

FIG. 14 shows timings at which recording is started for a bit stream of coded image data received.

The recording start instruction signal S10 is a signal which is generated when the recording start switch (not shown) is pressed and is a signal output from the recording start instruction signal input terminal 311 in FIG. 13.

A header detection signal S11 is a signal which is generated when a code indicating the beginning of GOP is detected from among a bit stream of image data and is output from the header information detection circuit 310 in FIG. 13.

When these signals are synchronized in the recording start signal generation circuit 312, the recording start signal generation circuit 312 generates a recording start signal S20. This signal is sent out to the header information writing circuit 313 and the system control circuit 314. In response to the signal, the header information writing circuit 313 performs an operation for writing recording start information in the first GOP header information, and the system control circuit 314 effects control of starting an image data recording operation.

FIG. 14 shows that the recording start instruction signal S10 is input while image data of GOP (I–1) is being received, and when a code indicating the beginning of GOP (E) is detected from among the header information of GOP1 (which is header information immediately after the GOP (I–1)), the recording start signal S30 is generated.

In this case, the delay circuit 302 makes it possible to record from the first coded image data, including the header information of GOP (I) after the GOP (I–1) in which the recording start switch is pressed.

By using the above-described recorder, when recording received coded image data which is encoded by an encoding method which conforms to MPEG, it becomes possible to record the correct amount of image data of GOP which is an encoding unit.

According to one aspect of the present invention, when image data is recorded on a recording medium (which image data is coded in such a way that a plurality of frames of moving pictures are encoded as one encoding unit), the image data can be recorded in predetermined recording units determined by the recording medium. Thus, in a case where stopping of recording is instructed, since recording in the above encoding units is continued until all the currently recorded data in the encoding units are recorded on the recording medium, it is possible to record the correct amount of image data in encoding units on a recording medium.

According to another aspect of the present invention, since the recording unit is made to be the unit of the error-correcting-coding, recording in the error-correcting-coding units is made possible, and an operation for adding an error-correcting-code in recording units can be completed.

According to still another aspect of the present invention, since N tracks (N≧1) in a VTR using helical scan is made to be a recording unit, it is possible to record data in such a way that the above operation is completed for one track of the recording medium in the VTR.

According to a further aspect of the present invention, since a moving picture encoding method (in which intra frame encoding and inter frame encoding are combined) is used, it is possible to record image data (coded on the basis of an encoding method which conforms to MPEG) on a recording medium.

According to a still further aspect of the present invention, since the moving picture encoding method is an encoding method in conformity with MPEG2, and the encoding unit is a GOP in MPEG2, it is possible to record without any omissions image data to be recorded for each GOP.

According to a still further aspect of the present invention, when starting of recording of image data is instructed, recording starts from data in encoding units after the currently input data in the encoding units. Thus, it is possible to prevent a problem that only a part of image data in encoding units is recorded on a recording medium when image data (coded in such a way that a plurality of frames in a moving picture are encoded as one encoding unit) is recorded on a magnetic tape, and therefore it is possible to record the correct amount of image data in encoding units on the recording medium.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image data recorder, comprising:
   input means for inputting coded data in which intra-frame coded data and inter-frame coded data are mixed in at predetermined intervals;
   recording means for recording said coded data on a recording medium in a plurality of tracks;
   instruction means for providing an instruction that recording by said recording means be stopped; and
   control means for detecting an end of each track, and for stopping recording on the basis of a combination of (i) the operation of said instruction means, (ii) the predetermined intervals, and (iii) the detection of the end of each track.

2. An image data recorder according to claim 1, wherein said predetermined interval is an interval in which an error-correcting-coding process is completed.

3. An image data recorder according to claim 1, wherein said predetermined interval corresponds to N (N≧1) tracks.

4. An image data recorder according to claim 1, wherein said coded data is data coded by an encoding method in conformity with MPEG2.

5. An image data recorder for recording image data coded by a moving picture encoding method that includes interfame encoding wherein a plurality of frames in a moving picture are assumed to be one encoding unit and wherein the coded image data is recorded in predetermined recording units determined by a recording medium, comprising:
   inputting means for inputting said coded image data;
   detecting means for detecting a start instruction to start recording of said coded image data; and
   recording means for recording said coded image data on the recording medium in accordance with an output of said detecting means, wherein said recording means controls a start recording operation such that the recording is performed from the beginning of said coded image data in said encoding unit.

6. An image data recorder according to claim 5, wherein said recording unit comprises an error-correcting-coding unit.

7. An image data recorder according to claim 5, wherein said recording unit comprises N (N≧1) tracks in a VTR using helical scan.

8. An image data recorder according to claim 5, wherein said moving picture encoding method is an encoding method in which inter-frame encoding and inter-frame prediction encoding are combined.

9. An image data recorder according to claim 5, wherein said moving picture encoding method is an encoding method in conformity with MPEG2, and said encoding unit is a GOP (group of pictures) in MPEG2.

10. A method for recording coded image data which is coded such that frames of image data are intermixed and grouped into predetermined encoding units, said method comprising the steps of:

inputting the coded image data;

receiving a stop recording command or a start recording command for stopping or starting a recording operation respectively;

stopping or starting recording the coded image data to a recording medium in response to the stop recording command or the start recording command, respectively; and controlling a stop recording operation or a start recording operation such that the recording is not stopped or started at the coded image data situated in the middle of the encoding unit.

11. A method according to claim 10, wherein the controlling step stops or starts recording the coded image data only at the end of an encoding unit.

12. A method according to claim 10, wherein the controlling step stops or starts recording the coded image data at the end of an encoding unit which is different from the currently-input encoding unit.

13. A method according to claim 10, wherein the recording medium has a plurality of recording tracks, and wherein the controlling step stops or starts recording the coded image data on the basis of a combination of (i) receipt of the stop recording command or the start recording command, (ii) the end of an encoding unit, and (iii) the end of each track.

14. A method according to claim 10, wherein the coding method is a method in conformity with MPEG.

15. Apparatus for recording coded image data which is coded such that frames of image data are intermixed and grouped into predetermined encoding units, said apparatus comprising:

means for inputting the coded image data;

means for receiving a stop recording command or a start recording command for stopping or starting a recording operation, respectively;

means for stopping or starting the recording of the coded image data to a recording medium in response to the stop recording command or the start recording command, respectively; and control means for controlling a stop recording operation or a start recording operation such that the recording is not stopped or started at the coded image data situated in the middle of the encoding unit.

16. Apparatus according to claim 15, wherein the control means stops or starts recording the coded image data only at the end of an encoding unit.

17. Apparatus according to claim 15, wherein said control means stops or starts the recording of the coded image data at the end of an encoding unit which is different from the currently-input encoding unit.

18. Apparatus according to claim 15, wherein the recording medium has a plurality of tracks, and wherein said control means stops or starts the recording of the coded image data on the basis of (i) receipt of the stop recording command or the start recording command by the means for receiving a stop recording command or a start recording command for stopping or starting a recording operation, (ii) the end of the encoding unit, and (iii) the end of each track.

19. Apparatus according to claim 10, wherein the image data is encoded by an encoding method in conformity with MPEG.

20. Apparatus according to claim 10, wherein the coded image data is moving picture image data encoded in accordance with an encoding method in which inter-frame encoding and inter-frame prediction encoding are combined.

* * * * *

UNITED STATES PATENT AND TRADEMARK OFFICE
CERTIFICATE OF CORRECTION

PATENT NO. : 5,710,859
DATED : January 20, 1998
INVENTOR(S) : YOSHITAKA TAKEUCHI, ET AL.

It is certified that error appears in the above-identified patent and that said Letters Patent is hereby corrected as shown below:

Column 2

Line 17, ixJ block" should read --ixj block--.

Column 6

Line 65, "(i+11)" should read --(i+1)--.

Column 9

Line 24, (E)" should read --(1)--.

Column 10

Line 4, "when" should be deleted.

Column 12

Line 31, "claim 10," should read --claim 15,--.
Line 34, "claim 10," should read --claim 15,--.

Signed and Sealed this

Twenty-first Day of July, 1998

Attest:

BRUCE LEHMAN

*Attesting Officer*     *Commissioner of Patents and Trademarks*